(12) United States Patent
Jahanghir et al.

(10) Patent No.: US 8,630,354 B2
(45) Date of Patent: Jan. 14, 2014

(54) HARDWARE ACCELERATED COMPRESSED VIDEO BITSTREAM ESCAPE CODE HANDLING

(75) Inventors: Musa Jahanghir, Palo Alto, CA (US);
Adrian R. Pearson, Phoenix, AZ (US);
Prasenjit Biswas, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 1978 days.

(21) Appl. No.: 11/454,410

(22) Filed: Jun. 16, 2006

(65) Prior Publication Data

US 2007/0291851 A1 Dec. 20, 2007

(51) Int. Cl.
*H04N 7/12* (2006.01)
(52) U.S. Cl.
USPC .............................. 375/240.26; 375/240.01
(58) Field of Classification Search
USPC ................ 375/240, 240.01, 240.15, 240.25, 375/240.26; 386/95; 341/67
See application file for complete search history.

(56) References Cited

U.S. PATENT DOCUMENTS

| 5,812,074 A | 9/1998 | Chung |
| 5,940,016 A | 8/1999 | Lee |
| 6,285,789 B1 | 9/2001 | Kim |
| 6,563,876 B2* | 5/2003 | Boyce et al. ............. 375/240.15 |
| 7,116,894 B1* | 10/2006 | Chatterton ....................... 386/95 |
| 2004/0028141 A1* | 2/2004 | Hsiun et al. .............. 375/240.25 |
| 2006/0071829 A1* | 4/2006 | Pearlstein et al. .............. 341/67 |

OTHER PUBLICATIONS

Pending U.S. Appl. No. 11/168,617, filed Jun. 27, 2005, inventor Haque et al.
Pending U.S. Appl. No. 11/027,478, filed Dec. 31, 2004, inventor: Lippincott et al.

* cited by examiner

*Primary Examiner* — Allen Wong
(74) *Attorney, Agent, or Firm* — Trop, Pruner & Hu, P.C.

(57) ABSTRACT

Apparatus, systems and methods for hardware accelerated compressed video bitstream escape code handling are disclosed including an apparatus comprising a bitstream parser (BSP) to parse a bitstream of compressed video data. The BSP includes circuitry to extract uncompressed run and level data from the bitstream when the BSP detects an escape code in the bitstream. Other implementations are disclosed.

6 Claims, 4 Drawing Sheets

HARDWARE ACCELERATED COMPRESSED VIDEO BITSTREAM ESCAPE CODE HANDLING

BACKGROUND

Video decompression, or the process of reconstructing a compressed video stream, requires many different software (SW) algorithms and hardware (HW) components. At a high level, the HW components used to reconstruct Variable Length Coded (VLC) compressed video are very similar across different standard video codecs. One such HW component, the Variable Length Decode (VLD) component, parses an incoming video data bitstream including both VLC encoded data and unencoded data to extract VLC codes and other information needed to reconstruct the video data from the bitstream. Most VLD components parse the bitstream using an N bits at a time (Nbaat) scheme to accelerate the decode process.

Typical VLD components also use Look Up Tables (LUTs) to enhance performance. The LUTs index those VLC encoded symbols that are most likely to be encountered. However, to keep LUT sizes manageable and thus hardware costs down, rarer symbols are represented by escape codes rather than LUT indices. When a typical VLD component encounters an escape code it breaks from the Nbaat bitstream parsing flow while the associated symbol is reconstructed using SW routines. However, breaking the Nbaat flow like this dramatically increases the time required for the VLD component to process the incoming compressed bitstream.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
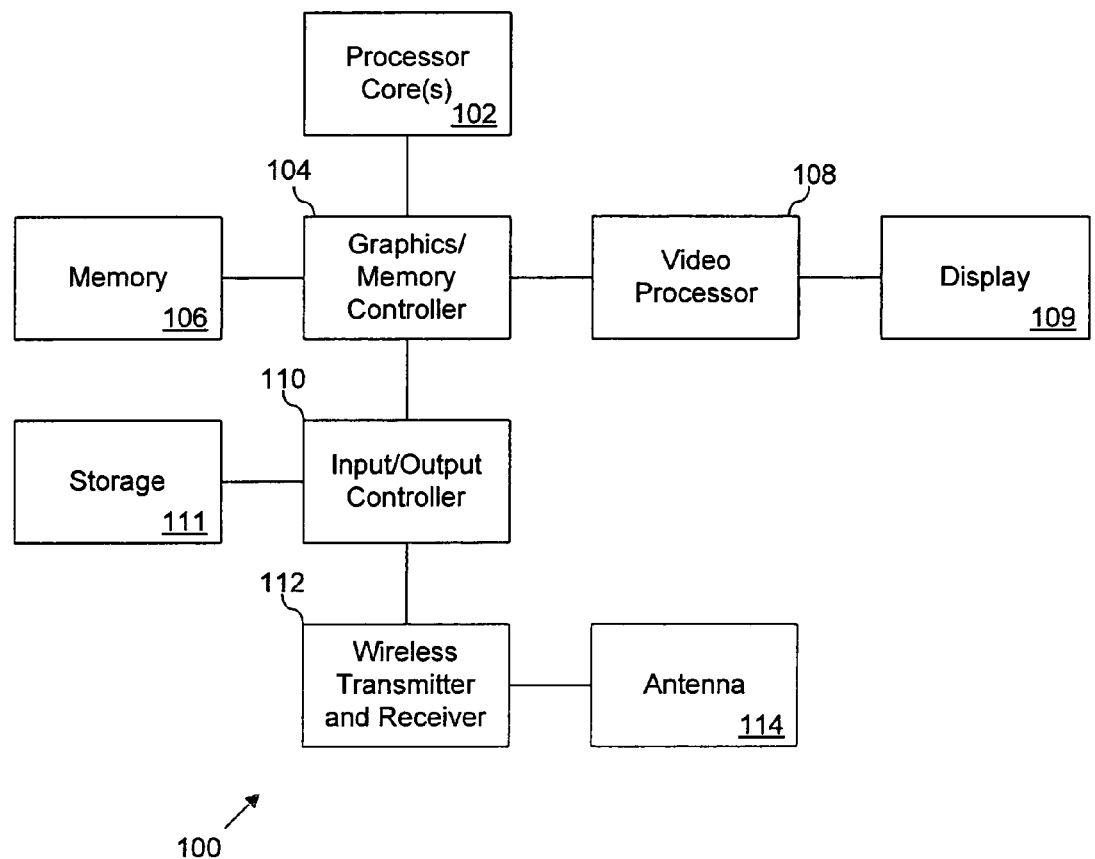
FIG. 1 is a block diagram illustrating an example system in accordance with some implementations of the invention.

FIG. 1 illustrates an example system 100 according to some implementations of the invention. System 100 includes one or more processor core(s) 102 coupled to a graphics/memory controller 104 in addition to memory 106 (e.g., dynamic random access memory (DRAM), static random access memory (SRAM), flash, etc.), a video processor (VP) 108, a display 109, and an input/output (I/O) controller 110 all coupled to controller 104. System 100 also includes storage 111 coupled to I/O controller 110, wireless transmitter circuitry and wireless receiver circuitry 112 coupled to I/O controller 110 and an antenna 114 (e.g., dipole antenna, narrowband Meander Line Antenna (MLA), wideband MLA, inverted "F" antenna, planar inverted "F" antenna, Goubau antenna, Patch antenna, etc.) coupled to circuitry 112. Storage 111 may comprise any non-volatile information or data storage device or devices such as Flash memory, and/or a hard disk drive to name a few examples.

System 100 may assume a variety of physical implementations. For example, system 100 may be implemented in a set top box (STB), personal computer (PC), a networked PC, a media PC, a server computing system, a handheld computing platform (e.g., a personal digital assistant (PDA)), a gaming system (portable or otherwise), a 3D capable cellular telephone handset, etc. Moreover, while some components of system 100 may be implemented within a single device, such as a system-on-a-chip (SOC) integrated circuit (IC), components of system 100 may also be distributed across multiple ICs or devices. For example, processor core(s) 102, controllers 104/110, memory 106, circuitry 112 and antenna 114 may be implemented, in part, as multiple ICs contained within a single computing platform, such as a media PC or a STB to name a few examples. While VP 108 may also be implemented along with items 102-106 and 110-114 within a PC, STB or similar platform, it may, alternatively, also be implemented in display 109.

Processor core(s) 102 may comprise special purpose or general purpose processor core (s) including any control and/or processing logic, hardware, software and/or firmware, capable of providing graphics/memory controller 104 with compressed video data and/or instructions. Software applications executing on system 100 may use processor core(s) 102 to perform a variety of graphics calculations or processes such as rendering image data, etc. the results of which may be provided to graphics/memory controller 104 and/or that may be stored in memory 106 for eventual provision to or use by VP 108.

Processor core(s) 102 may further be capable of performing any of a number of tasks that support hardware accelerated compressed video escape code handling. These tasks may include, for example, although the invention is not limited in this regard, providing compressed video data to graphics/memory controller 104, downloading microcode to controller 104, initializing and/or configuring registers within controller 104, interrupt servicing, etc. While FIG. 1 may be interpreted as showing processor core(s) 102 and controller 104 as distinct ICs, the invention is not limited in this regard and those of skill in the art will recognize that processor core(s) 102 and controller 104 and possibly additional components of system 100 such as I/O controller 110 may be implemented within a single IC.

Graphics/memory controller 104 may comprise any processing logic, hardware, software, and/or firmware, capable of processing or controlling compressed video data supplied to VP 108 and/or memory 106. Graphics processor 104 may receive compressed video data from processor core(s) 102, or from elsewhere in system 100 such as storage 111, and may supply that compressed video data in the form of a bitstream of encoded video data to VP 108 for Variable Length Coded (VLC) decode processing in accordance with some implementations of the invention as will be described in greater detail below.

VP 108 may comprise any video processing logic, hardware, software, and/or firmware, capable of processing or decoding compressed video data to provide decompressed video data to display 109. For example, VP 108 may be a digital signal processor (DSP) although the invention is not limited by the descriptive label applied to VP 108. Controller 104 may retrieve compressed video data from memory 106 and provide that data to VP 108 as a bitstream of encoded video data and VP 108 may parse and decode that bitstream using, for example, VLC decode processing in accordance with some implementations of the invention as will be described in greater detail below. While the invention is not limited in this regard, those skilled in the art will recognize that VP 108 may also undertake a variety of other video or image processing functions such as image scaling, alpha blending, etc.

While FIG. 1 shows controller 104 and VP 108 as distinct components, the invention is not limited in this regard, and those of skill in the art will recognize that, for example, some if not all of the functionality of VP 108 may be provided by controller 104 or processor core(s) 102 or in control logic and processing logic that is not organized into a single discrete processor or controller IC. Moreover, those skilled in the art will recognize that that the functionality of VP 108 may be implemented in whole or part in display 109. Display 109 may be any type of display such as a direct view liquid crystal display (LCD), a projection LCD, a plasma display panel (PDP), a digital light processing (DLP) projection display, or an electroluminescent (EL) display to name several more common examples.

Figure 2:
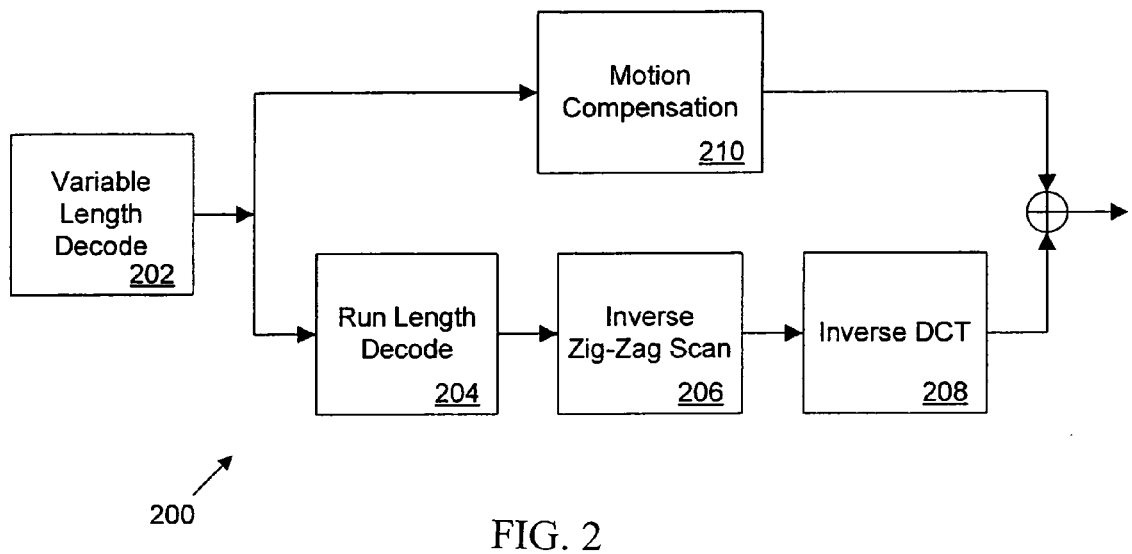
FIG. 2 is a block diagram illustrating portions of the video processor of FIG. 1 in greater detail in accordance with some implementations of the invention.

FIG. 2 illustrates portions of a video processor (VP) 200, such as VP 108 of FIG. 1, in greater detail. VP 200 includes a VLC decode module (VLD) 202, a run length decode module (RLD) 204 coupled to VLD 202, an inverse zig-zag scan module (IZZ) 206 coupled to RLD 204, an inverse Direct Cosine Transfer module (IDCT) 208 coupled to IZZ 206, and a motion compensation module (MC) 210 coupled to VLD 202.

RLD 204, IZZ 206, IDCT 208, and MC 210, while not particularly germane to the invention, have been included in FIG. 2 in the interests of completeness. Those skilled in the art will appreciate the typical functionality of items 204-210 and, thus, this functionality will not be discussed in any greater detail herein.

Those skilled in the art will recognize that VLD 202 may receive a bitstream of video data included encoded or compressed video data including code words or symbols representing particular block transform coefficients. VLD 202 may then parse that bitstream using N bits at a time (Nbaat) techniques to extract the code words or symbols and then use the extracted symbols as indices to one or more Look Up Tables (LUTs) (not shown) to obtain the associated run and level values representing the values of frequency domain coefficients. VLD 202 may then supply those run and level values to RLD 204 for reconstruction of the associated coefficients.

In accordance with some implementations of the invention, as will be explained in greater detail below, VLD 202, upon encountering an escape code in the bitstream, may use processing logic or circuitry to extract the associated run and level values from the bitstream without breaking from the Nbaat parsing flow. In other words, in accordance with some implementations of the invention, VLD 202 may use hardware rather than software or firmware to obtain run and level values associated with escape codes that VLD 202 detects or encounters in parsing the bitstream.

Figure 3:
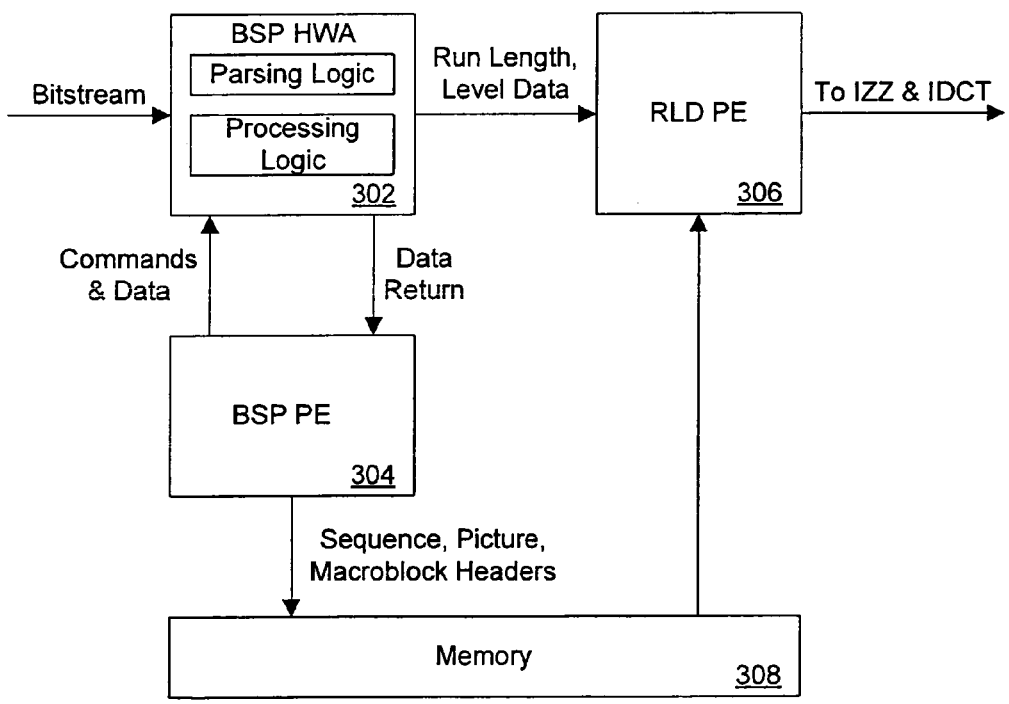
FIG. 3 is a block diagram illustrating portions of the video processor of FIG. 2 in greater detail in accordance with some implementations of the invention.

FIG. 3 illustrates portions of a video processor (VP) 300, including items similar to VLD 202 and RLD 204 of VP 20 of FIG. 2, in greater detail. VP 300 includes a BitStream Parser Hardware Accelerator module (BSP HWA) 302, a BSP Processing Engine module (BSP PE) 304 coupled to BSP HWA 302, an RLD module 306 coupled to BSP HWA 302, and memory (e.g., cache memory) coupled to both BSP PE 304 and RLD 306.

In accordance with some implementations of the invention, BSP HWA 302 may, in response to control data or commands issued by BSP PE 304, use parsing logic or circuitry implementing an parsing scheme or flow to parse an incoming video bitstream, where that bitstream includes symbols, VLC coded and otherwise. BSP HWA 302 may use internal LUTs (not shown) to retrieve run length and level data or values associated with VLC coded symbols and then supply those values to RLD 306 for further decode processing. BSP HWA 302 may also supply other information extracted from the bitstream, such as sequence, picture and macroblock headers associated with the VLC coded data to BSP PE 304. BSP PE 304 may then store that other information in memory 308 from which it may eventually be re-associated with the VLC coded data by RLD module 306.

In accordance with some implementations of the invention, as will be explained in greater detail below, BSP HWA 302, upon encountering an escape code in the bitstream, may use processing logic or circuitry to extract the associated run and level values without requiring the parsing logic to break or depart from the Nbaat parsing scheme or flow. Thus, in accordance with some implementations of the invention, BSP HWA 302 may use hardware rather than software or firmware to process escape codes encountered in the bitstream. In accordance with some implementations of the invention, parsing logic in BSP HWA 302 may implement Nbaat parsing by parsing the incoming bitstream four bits at a time (4Baat). However, the invention is not limited to a particular decode parsing scheme. Thus, in accordance with some implementations of the invention, parsing logic in BSP HWA 302 may implement other Nbaat schemes, such as, to name a few other examples, 3Baat or 5Baat parsing schemes.

Figure 4:
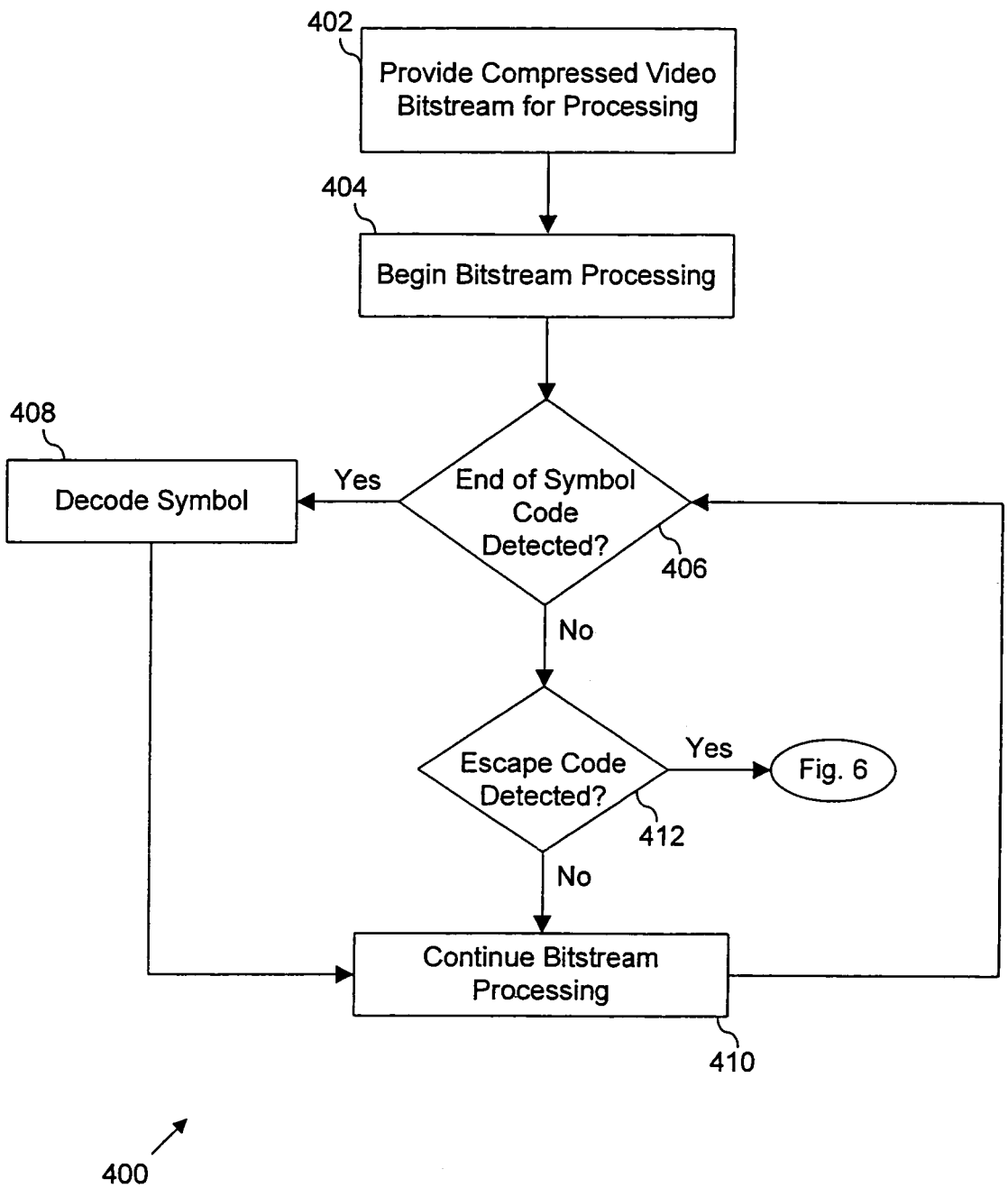
FIG. 4 is a flow chart illustrating a process in accordance with some implementations of the invention.

FIG. 4 illustrates a process 400 for hardware accelerated compressed video bitstream escape code handling in accordance with some implementations of the invention. While, for ease of explanation, process 400, and associated processes, may be described with regard to system 100 of FIG. 1, or video processors 200/300 of FIGS. 2 and 3, the invention is not limited in this regard and other processes or schemes supported and/or performed by appropriate devices and/or combinations of devices in accordance with the invention are possible.

Process 400 may begin with the provision of a compressed video data bitstream for processing [act 402]. Act 402 may be undertaken by having controller 104 supply the bitstream to VP 108 where controller 104 has, for example, obtained the bitstream from memory 106 or from storage 111 via I/O controller 110 (i.e., where storage 111 may, for example, comprise a Digital Video Disk (DVD) storing the bitstream).

Thus, referring also to FIG. 2, act 402 may involve a bitstream being provided to VLD module 202. Or, in other words, referring to FIG. 3, act 402 may involve a bitstream being provided to an input buffer (not shown) of BSP HWA 302 where that bitstream may include VLC codes and escape codes.

Process 400 may continue with the beginning of processing of the bitstream [act 404]. In accordance with some implementations of the invention, act 404 may be undertaken by BSP HWA 302 in response to a decode command issued by BSP PE 304 instructing BSP HWA 302 to undertake Nbaat processing (i.e., parsing and decoding) of at least a portion of the bitstream provided in act 402. BSP HWA 302 may, in act 404, begin processing of the bitstream in a block-wise fashion, where that processing may include a series of acts (not shown) such as the use of parsing logic to parse the bitstream by recognizing code boundaries. Those skilled in the art will recognize that a BSP, such as BSP HWA 302, may parse and decode a compressed video bitstream in a block-wise fashion where the bitstream conveys the video data as a series of eight-by-eight blocks of pixel data, each block comprising 64 frequency coefficients where each coefficient is specified by a different VLC symbol or code word.

Figure 5:
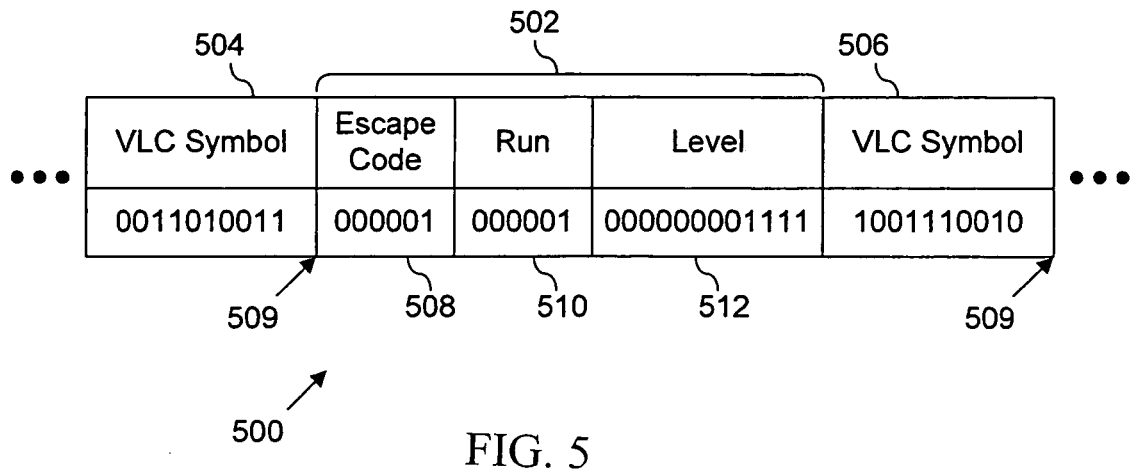
FIG. 5 is a block diagram illustrating an example portion of a video data bitstream including an escape code sequence.

FIG. 5 is a block diagram illustrating a portion 500 of an example compressed video bitstream including a 24-bit escape code sequence 502 and a couple of representative 10-bit VLC code words or symbols 504 and 506. Escape code sequence 502 includes a 6-bit escape code or symbol 508 followed by a 6-bit run value 510 and a 12-bit level value 512 in uncompressed form. Each VLC word 504/506 may end with an end-of-symbol (EOS) code 509. Those skilled in the art will recognize that each EOS code 509 may be implied, that is, that a BSP such as BSP HWA 302 may parse a bitstream of 10-bit VLC symbols four bits at a time (4baat) and that after three clock cycles of parsing a particular VLC symbol that BSP will recognize that ten valid bits have been acquired and hence that an EOS code has been detected.

Those skilled in the art will also recognize that video bitstreams such as portion 500 are typically parsed in a left-to-right fashion with respect to how portion 500 is depicted in FIG. 5. Thus, parsing logic in BSP HWA 302 may, for example, in undertaking act 404 encounter or detect VLC symbol 504 before encountering or detecting escape code 508. While those skilled in the art will also recognize that escape codes may be used in a compressed video bitstream to account for low probability frequency domain or transform coefficients, those skilled in the art will also recognize that escape codes may also be used to signify other bitstream events such as End of Block, First Symbol, etc. Those skilled in the art will further recognize that portion 500 and escape code sequence 502 may be examples of portions of a bitstream that conforms to ISO/IEC standard 13818-2, published Apr. 4, 2002 (a.k.a., the "MPEG-2" video codec standard). The invention is, however, not limited to a particular codec standard or bitstream and/or escape code sequence syntax and, thus, bitstream portion 500 including sequence 502 are provided purely for the purposes of discussing portions of process 400 and should not be considered limiting in any way.

Returning to FIG. 4 and referring also to FIG. 5, act 404 may, for example, involve BSP HWA 302 extracting VLC code word or symbol 504 by 4baat parsing bitstream portion 500. Process 400 may then continue with a determination of whether an EOS code has been detected [act 406]. In accordance with some implementations of the invention, act 406 may be undertaken by BSP HWA 302. Thus, for example, act 406 may involve parsing logic in BSP HWA 302 recognizing or detecting the EOS code 509 of VLC symbol 504. As mentioned above, those skilled in the art will recognize that BSP HWA 302 may recognize or detect EOS code 509 of VLC symbol 504 when BSP HWA 302 has determined that enough valid bits representing VLC symbol 504 have been detected or extracted from the bitstream.

If the result of act 406 is positive, that is if an EOS code is detected, then process 400 may continue with symbol decoding [act 408]. In accordance with some implementations of the invention, act 408 may be undertaken by having BSP HWA 302 use the extracted VLC code word or symbol as an index to access run and level values from one or more LUTs (not shown). BSP HWA 302 may then provide those run and level values to RLD PE 306 for further decode processing.

Process 400 may then continue with continued bitstream processing [act 410]. Thus, for example, after extracting VLC symbol 504, using it to obtain the associated run and level values and supplying those values to RLD PE 306, BSP HWA 302 may then continue to parse the bitstream.

If, on the other hand, the result of act 406 is negative, that is if an EOS code is not detected, then process 400 may continue with a determination of whether an escape code has been detected [act 412]. In accordance with some implementations of the invention, act 412 may be undertaken by BSP HWA 302. Thus, for example, in undertaking act 410, BSP HWA 302 may encounter or detect escape code 508 and, hence, while the result of act 406 may be negative (i.e., EOS code not detected) the result of act 412 may be positive (i.e., escape code detected). If the determination of act 412 is that an escape code has been detected then a process 600 of FIG. 6 may be undertaken.

Figure 6:
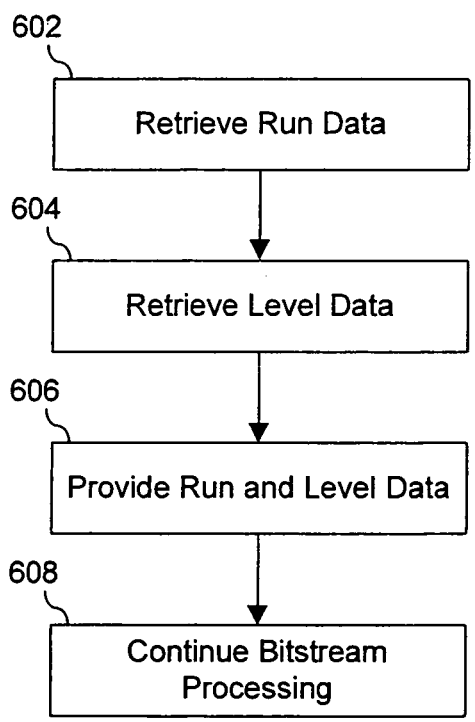
FIG. 6 is a flow chart illustrating another process in accordance with some implementations of the invention.

FIG. 6 illustrates a process 600 for hardware accelerated compressed video bitstream escape code handling in accordance with some implementations of the invention. While, for ease of explanation, process 600, and associated processes, may be described with regard to system 100 of FIG. 1, or video processors 200/300 of FIGS. 2 and 3, or the bitstream portion 500 of FIG. 5, the invention is not limited in this regard and other processes or schemes supported and/or performed by appropriate devices and/or combinations of devices in accordance with the invention are possible.

Process 600 may begin with the retrieval of the run data [act 602] associated with an escape code. In accordance with some implementations of the invention, and also referring to FIG. 5, act 602 may be undertaken by processing logic or circuitry in BSP HWA 302 retrieving, for example, the run bits 510 associated with escape code 508. Process 600 may then continue with the retrieval of the level data [act 604] associated with the escape code. As in act 602, act 604 may be undertaken by, for example, processing logic or circuitry in BSP HWA 302 retrieving the level bits 512 associated with escape code 508 after BSP HWA 302 has retrieved the run bits 510 in act 602.

Process 600 may then continue with the provision of the run and level data trip [act 606]. In accordance with some implementations of the invention, act 606 may be undertaken by logic or circuitry in BSP HWA 302 providing the run and level data retrieved in acts 602 and 604 to an output buffer (not shown) of BSP HWA 302 or to an input buffer (also not shown) of RLD PE 306. Although the invention is not limited in this regard, the run and level data provided in act 606 may be provided in the form of a data triplet.

Process 600 may then conclude with the continued bitstream processing [act 608]. In accordance with some implementations of the invention, act 608 may comprise BSP HWA 302 continuing the Nbaat parsing and decoding of the bitstream after that point at which an escape code was encountered. In other words, after BSP HWA 302, for example, encountered the escape code 508 subsequent to decoding VLC symbol 504 and undertook acts 602-606 in response, BSP HWA 302 may undertake act 608 by automatically proceeding to extract VLC symbol 506 of bitstream portion 500.

The acts shown in FIGS. 4 and 6 need not be implemented in the order shown; nor do all of the acts necessarily need to be performed. Also, those acts that are not dependent on other acts may be performed before or in parallel with the other acts. For example, acts 406 and 412 may be undertaken in parallel or act 412 may be undertaken before act 406. Thus, BSP HWA 302 may recognize, for example, that when parsing the bitstream an escape code has been detected rather than a valid VLC symbol. That is, referring to FIG. 5, when, in undertaking act 404 or act 410, BSP HWA 302 has parsed the six bits corresponding to escape code 508, BSP HWA 302 may recognize that an EOS code has not been detected (negative result to act 406) but that, rather, an escape code has been detected (positive result to act 412). In this sense, BSP HWA 302 may undertake acts 406 and 412 simultaneously or in parallel. Further, at least some of the acts in FIGS. 4 and 6 may be implemented as instructions, or groups of instructions, implemented in a machine-readable medium.

In accordance with some implementations of the invention as described above, implementations of the invention permit a video processor that is undertaking Nbaat processing of a compressed video data bitstream to also process data associated with an escape code without breaking from the Nbaat processing. Thus, a processor in accordance with some implementations of the invention may use hardware processing logic to extract run and level data associated with an escape code from a bitstream without breaking from Nbaat parsing of that bitstream. A processor in accordance with some implementations of the invention may extract run and level data associated with an escape code from a bitstream without breaking from Nbaat parsing of that bitstream because the processor does not use software or firmware to handle the escape code processing.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention. For example, rather than following processes 400 and 600, schemes in accordance with implementations of the invention may include detecting an escape code, inserting or associating a location marker in the bitstream where the escape code was detected, undertaking hardware decoding of the escape code in parallel with continued decoding of the remaining bitstream, and then merging, using the location marker, the results of the escape code decoding with the results of the decoding of the remaining bitstream. Clearly, many other implementations may be employed to provide a method, apparatus and/or system to implement hardware accelerated compressed video bitstream escape code handling consistent with the claimed invention.

No element, act, or instruction used in the description of the present application should be construed as critical or essential to the invention unless explicitly described as such. Also, as used herein, the article "a" is intended to include one or more items. In addition, some terms used to describe some implementations of the invention, such as "image data" may be used interchangeably with "video data" in some circumstances. Moreover, when terms such as "coupled" or "responsive" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method comprising:
beginning N-bits at a time (Nbatt) processing of a bitstream of compressed variable length coded video data using hardware processing logic;
searching for an end of symbol code and an escape code in said bitstream;
if said end of symbol code is found, using said code as an index to obtain run and level values from one or more lookup tables;
if said escape code is found, extracting said run and level data using said escape code; and
using said hardware processing logic to extract run and level data without breaking from Nbaat parsing of the bitstream.

2. The method of claim 1, wherein processing of the bitstream comprises parsing the bitstream.

3. The method of claim 2, wherein parsing the bitstream includes detecting code word boundaries in the bitstream.

4. The method of claim 2, wherein parsing of a bitstream comprises N bits at a time (Nbaat) parsing of a bitstream.

5. The method of claim 4, wherein N comprises an integer selected from one of three, four or five.

6. The method of claim 1, wherein the bitstream is an MPEG-2 compliant bitstream.

* * * * *